United States Patent
Aselage et al.

(10) Patent No.: US 9,156,423 B1
(45) Date of Patent: Oct. 13, 2015

(54) ACTIVE BOLSTER WITH ACTIVE VENT FORMED IN ATTACHMENT BOSSES

(71) Applicant: FORD GLOBAL TECHNOLOGIES, LLC, Dearborn, MI (US)

(72) Inventors: Brandon M. Aselage, White Lake, MI (US); Sean B. West, Monroe, MI (US); Stacey H. Raines, Ypsilanti, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/299,559

(22) Filed: Jun. 9, 2014

(51) Int. Cl.
*B60R 21/045* (2006.01)
*B60R 21/239* (2006.01)
*B60R 7/06* (2006.01)

(52) U.S. Cl.
CPC ............. *B60R 21/045* (2013.01); *B60R 21/239* (2013.01); *B60R 7/06* (2013.01)

(58) Field of Classification Search
CPC .. B60R 21/045; B60R 21/206; B60R 21/239; B60R 2021/0407; B60R 2021/23169; B60R 7/06
See application file for complete search history.

(56) References Cited

U.S. PATENT DOCUMENTS

| | | | | |
|---|---|---|---|---|
| 5,382,051 | A * | 1/1995 | Glance | 280/751 |
| 5,536,043 | A * | 7/1996 | Lang et al. | 280/753 |
| 6,170,871 | B1 * | 1/2001 | Goestenkors et al. | 280/743.1 |
| 6,712,385 | B2 * | 3/2004 | Enders | 280/730.1 |
| 6,817,627 | B2 * | 11/2004 | Galmiche et al. | 280/730.1 |
| 6,874,811 | B2 * | 4/2005 | Enders et al. | 280/730.1 |
| 8,328,233 | B2 | 12/2012 | Kalisz | |
| 8,448,980 | B1 * | 5/2013 | Kalisz | 280/730.1 |
| 8,454,054 | B1 | 6/2013 | Raines | |
| 8,474,868 | B2 * | 7/2013 | Kalisz et al. | 280/753 |
| 8,491,008 | B2 | 7/2013 | Roychoudhury et al. | |
| 8,544,879 | B1 * | 10/2013 | Mazzocchi et al. | 280/730.1 |
| 8,579,325 | B2 | 11/2013 | Roychoudhury | |
| 8,596,681 | B1 * | 12/2013 | Strunk et al. | 280/752 |
| 8,720,943 | B1 | 5/2014 | Mazzocchi et al. | |
| 8,720,948 | B2 * | 5/2014 | Raines et al. | 280/752 |
| 2011/0109064 | A1 | 5/2011 | Best et al. | |

FOREIGN PATENT DOCUMENTS

EP 1314615 B1 5/2003

* cited by examiner

*Primary Examiner* — Laura Freedman
(74) *Attorney, Agent, or Firm* — Vichit Chea; MacMillan, Sobanski & Todd, LLC

(57) ABSTRACT

An active bolster mounts at an interior trim surface of a passenger compartment in an automotive vehicle. A plastic-molded front wall deploys in a deployment direction toward a passenger in the passenger compartment. A plastic-molded back wall is joined around a substantially sealed perimeter with the front wall to form an inflatable bladder. The back wall includes at least one substantially circumferential pleated baffle and a plurality of attachment towers projecting from a central region disposed within the baffle to join with a reaction surface. An inflator couples an inflation gas into the inflatable bladder in response to a crash event of the vehicle. At least one of the attachment towers includes an elongated notch sunk partially into a surface of the attachment tower to provide a thinned wall section configured to tear open at a predetermined pressure during inflation.

13 Claims, 5 Drawing Sheets

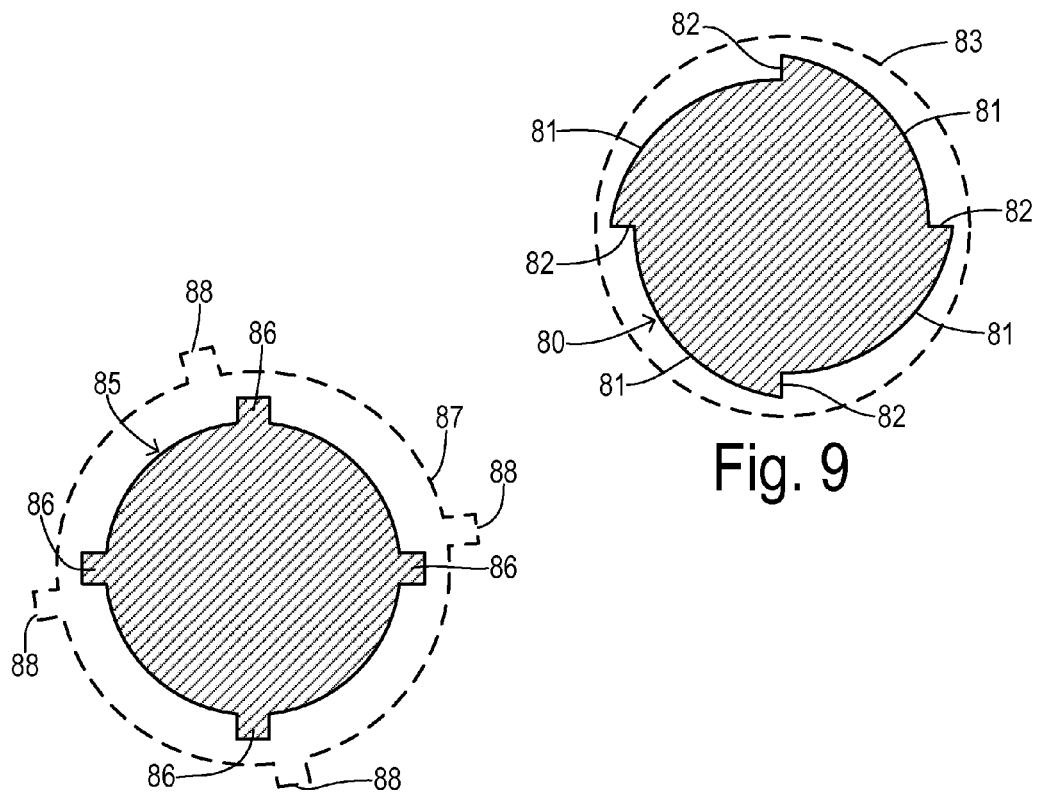
Fig. 9
Fig. 10
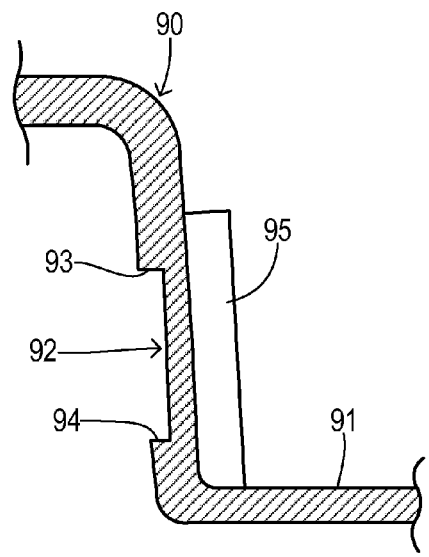
Fig. 11

ACTIVE BOLSTER WITH ACTIVE VENT FORMED IN ATTACHMENT BOSSES

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to active bolsters for occupant crash protection in automotive vehicles, and, more specifically, to an active bolster with an inflatable bladder formed by plastic wall panels that is vented via thinned wall sections that rupture in response to inflation pressures.

An active bolster is a vehicle occupant protection device with a gas-inflatable bladder to absorb impacts and reduce trauma to occupants during a crash. As opposed to deployable air bag cushions made of various fabrics that emerge from behind various openings upon inflation, active bolsters use the interior trim surface itself to expand at the beginning of a crash event for absorbing the impact and dissipating energy through the action of an inflation gas. U.S. Pat. No. 8,205,909, issued Jun. 26, 2012, incorporated herein by reference, discloses an active knee bolster integrated into a glove box door that is light weight and visually attractive. U.S. Pat. No. 8,474,868, issued Jul. 2, 2013, also incorporated herein by reference, discloses a typical structure wherein an active bolster includes a front wall or trim panel that faces a vehicle occupant attached to a back wall or bladder wall along a sealed periphery. One or both of the walls is deformable in order to provide an expandable, inflatable bladder. For example, the bladder wall may have a pleated (i.e., accordion-like) region that straightens out during inflation. The walls are initially spaced apart by a small amount when in their pre-deployment, non-inflated condition. This allows ingress of the inflation gas in a manner that achieves an even inflation across the panel.

The front and back walls of a typical bladder for an active bolster are comprised of molded thermoplastics such as poly-ethylene, polyolefin, or PVC. They are typically injection molded but can also be blow molded. When formed separately, the front and back walls must be hermetically joined around their periphery in order to ii) form the inflatable bladder. The joint must be strong to resist separation that could result from high inflation pressures during inflation and that result when a passenger impacts the bolster. The peripheral seal is formed by hot welding, for example.

It is known that in order to optimize the dissipation of energy when an occupant contacts an air bag or an active bolster, inflation gas should be vented to allow a controlled collapse of the airbag that safely decelerates the impacting occupant. U.S. Pat. No. 8,328,233, issued Dec. 11, 2012, which is incorporated herein by reference, discloses a variable vent for an active bolster wherein the vent has a low flow rate at low pressures and a higher flow rate at higher pressures across the vent. The reduced flow rate of the vent during initial stages of inflation permits the use of a smaller (less costly) inflator, while the higher vent flow rate at higher pressures helps ensure the integrity of the peripheral weld by limiting the pressure rise and avoiding large tearing forces that could cause the seal to fail.

Various types of structures and locations have been disclosed for adaptively venting inflation gas during inflation and during loading by an impacting passenger. Venting locations have been disclosed on the central, flat areas of the bladder wall facing the front wall, in upstanding ribs on the front, trim wall that form a peripheral weld track, and in the pleated baffle region of the bladder wall, for example. Previously disclosed structures for forming active vents have been relatively complex and have required complicated manufacturing steps that result in increased manufacturing costs. Known vents have also been typically placed on structures that may significantly deform during bladder inflation, which results in changes in the venting during deployment that are difficult to control or predict. Furthermore, known areas for vent placement are not always large enough to accommodate all the required venting area.

SUMMARY OF THE INVENTION

The present invention involves placing one or more active vents in an attachment tower(s) formed in a bladder wall that projects from the bladder wall for attachment to a reaction surface. Due to the orientation of the sides of the attachment towers, notch features can be easily formed using appropriate tool inserts during injection molding of the bladder wall in order to produce a thinned wall that tears open to limit pressure buildup during inflation. The size, shape, and number of notch features can be easily adjusted to customize vent performance, including threshold pressure and flow volumes. Moreover, the attachment towers provide plentiful surface area to accommodate large venting areas when needed.

In one aspect of the invention, an active bolster mounts at an interior trim surface of a passenger compartment in an automotive vehicle. A plastic-molded front wall deploys in a deployment direction toward a passenger in the passenger compartment. A plastic-molded back wall is joined around a substantially sealed perimeter with the front wall to form an inflatable bladder. The back wall includes at least one substantially circumferential pleated baffle and a plurality of attachment towers projecting from a central region disposed within the baffle to join with a reaction surface. An inflator couples an inflation gas into the inflatable bladder in response to a crash event of the vehicle. At least one of the attachment towers includes an elongated notch sunk partially into a surface of the attachment tower to provide a thinned wall section configured to tear open at a predetermined pressure during inflation.

BRIEF DESCRIPTION OF THE DRAWINGS

FIG. 9 is a horizontal cross section of a first embodiment of a mold insert for forming notches on an interior surface of an attachment tower.

FIG. 10 is a horizontal cross section of a second embodiment of a mold insert for forming notches on an interior surface of an attachment tower.

FIG. 11 is a vertical cross section showing another embodiment of a notch feature formed in an attachment tower.

DETAILED DESCRIPTION OF PREFERRED EMBODIMENTS

Figure 1:
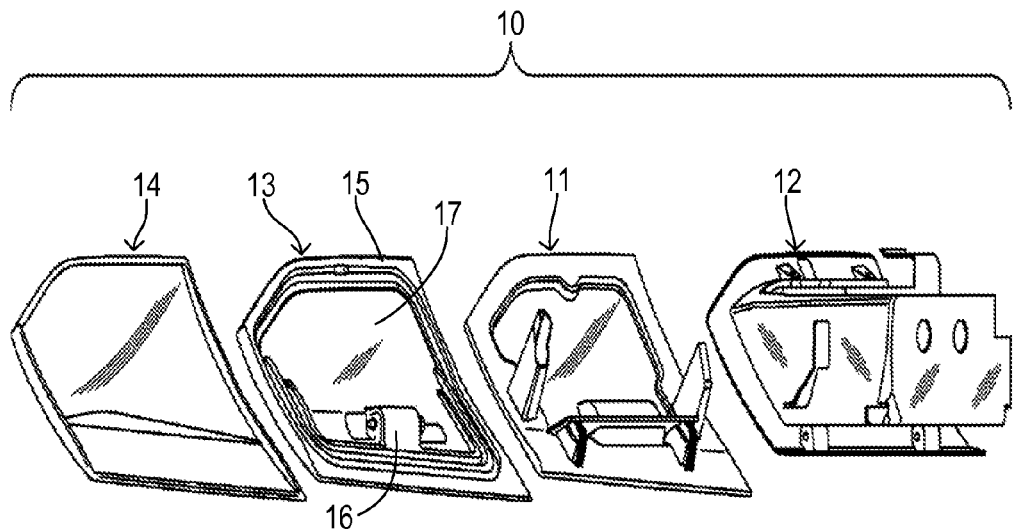
FIG. 1 is an outward-looking, exploded perspective view of an active knee bolster glove box door system of a type to which the present invention can be applied.

Referring now to FIG. 1, a prior art active knee bolster system 10 has a base panel component 11 which forms the foundation for the bolster. Base 11 may be either attached to the vehicle by hinging from a storage cavity or glove box 12 as shown in FIG. 1, or mounted to another structure such as an instrument panel support located below a steering column, for example. Such locations are accessible to the knees of an individual riding in a corresponding seating position within a vehicle.

In this embodiment, base 11 is a door inner wall or liner that acts as a reaction surface for supporting an inflatable bladder formed by a back (bladder) wall 13 and a front (trim) wall 14 that are joined around their periphery 15. Walls 13 and 14 are preferably comprised of molded plastics (such as thermoplastic polyolefin (TPO)) and are joined by plastic hot welding, such as hot plate or vibration welding, to form a peripheral seal around a central region 17 for forming an inflatable bladder. An inflation gas source 16 is electronically controlled for activating during a crash to release gas to inflate the bolster. Front wall 14 may comprise the Class A interior trim surface such as the outside of the glove box door, or an additional skin or cover (not shown) can be applied to its outer surface.

Figure 2:
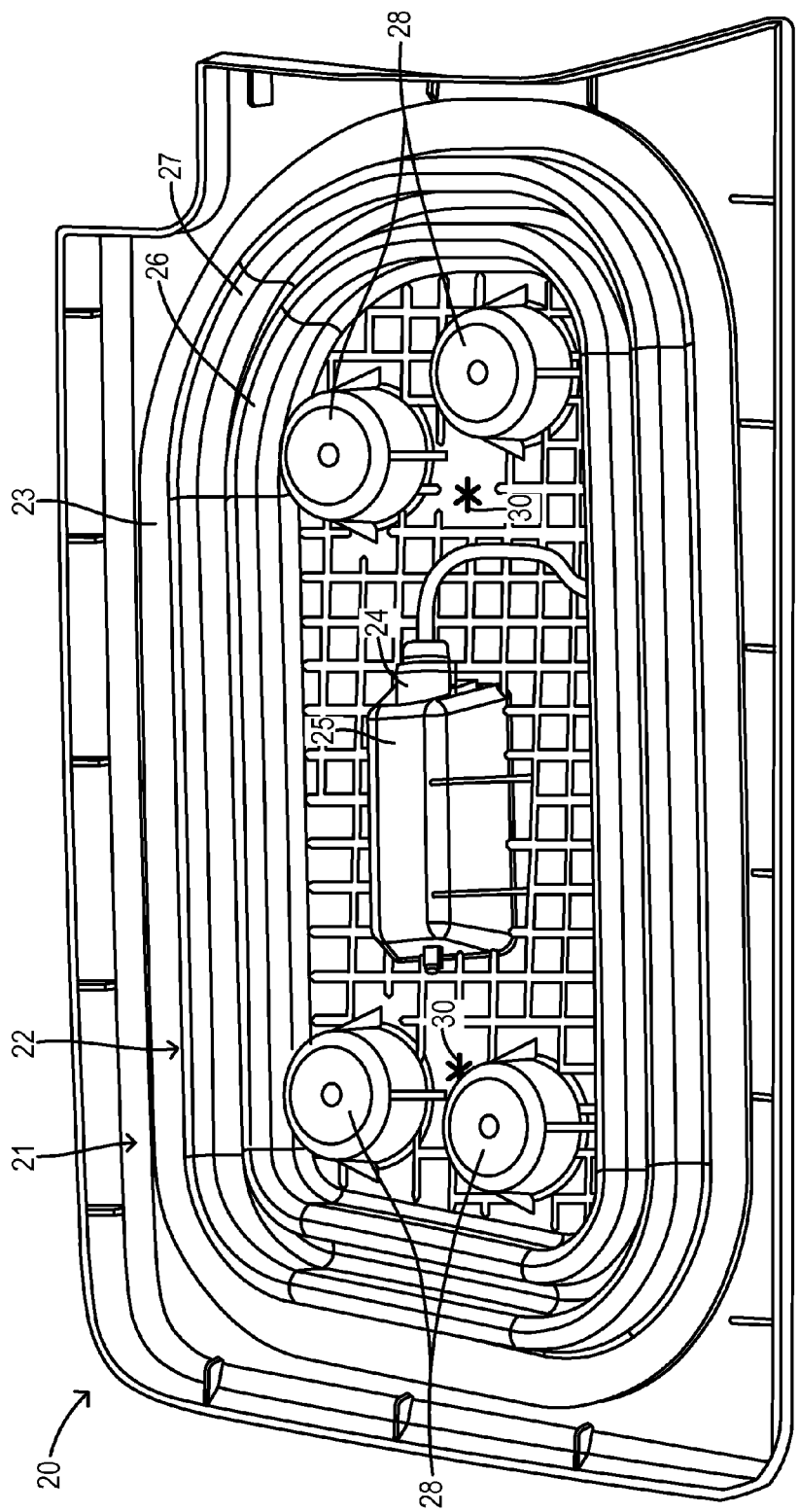
FIG. 2 is a rear perspective view of an inflatable bladder assembly of an active bolster.

FIG. 2 is a rear view of one type of known inflatable bladder 20 for an active bolster. A plastic-molded front wall 21 overlies a plastic-molded, expandable back wall 22. Walls 21 and 22 are joined around a closed perimeter region 23 to form an inflatable bladder having an open central volume between walls 21 and 22 to receive an inflation gas from an inflator 24 mounted in a recess 25 of back wall 22 during a crash event. Back wall 22 includes a plurality of pleats, such as 26 and 27, to accommodate the expansion of back wall 22 during inflation. A plurality of attachment towers (i.e., bosses) 28 project from a central region of back bladder wall 22 disposed within baffle pleats 26 and 27. Towers 28 are used to mount back wall 22 to a reaction surface (not shown). Vent holes 30 comprised of an asterisk-shaped pattern cut through bladder wall 22 vented the bladder chamber.

Figure 3:
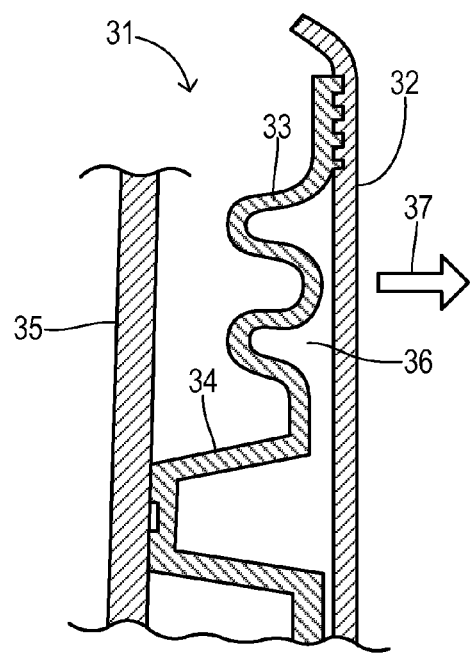
FIG. 3 is a side cross section showing a prior art active bolster assembly.

FIG. 3 shows a cross-section of a bolster 31 including a front trim wall 32 peripherally sealed to a bladder wall 33. Bladder wall 33 includes an attachment tower 34 welded to a reaction wall 35, which may be comprised of a glove box door inner liner, for example. During deployment as a result of an inflation gas being supplied into a bladder cavity 36, front trim wall 32 deploys in a deployment direction 37 toward a passenger in the passenger compartment of a vehicle.

Figure 4:
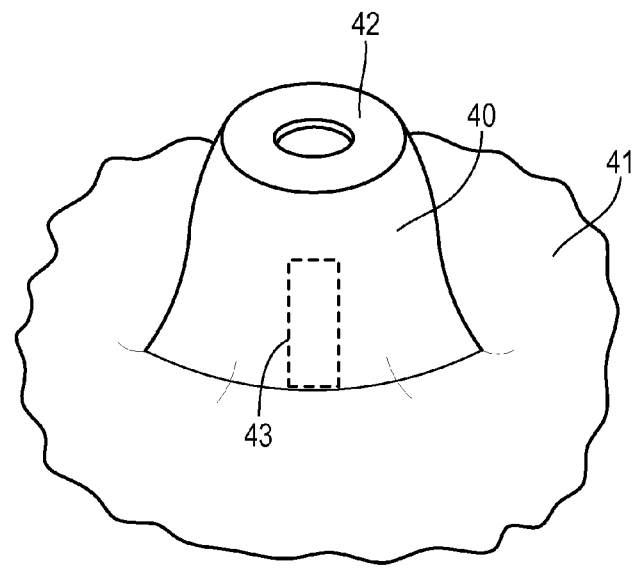
FIG. 4 is a perspective view of an attachment tower having a thinned section for forming an active vent.
Figure 5:
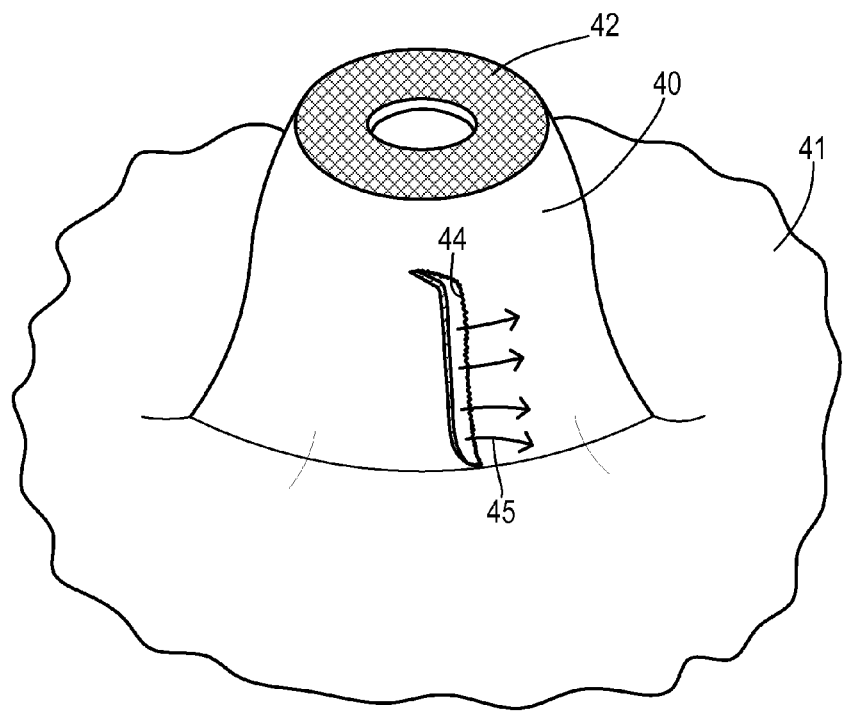
FIG. 5 is a perspective view of the active vent of FIG. 4 after being torn open by inflation gas.

The present invention introduces one or more thinned wall sections (i.e., notches) in one or more attachment towers. As shown in FIG. 4, an attachment tower 40 projects from a bladder wall 41 to join with a reaction surface (not shown) at a welding pad 42. An elongated notch 43 is sunk partially into either an interior or exterior surface of tower 40 to provide the thinned wall section adapted to tear open at a predetermined pressure during inflation. The thinning at notch 43 weakens wall 41. In addition, the sharp transition in thickness occurring at a longitudinal edge of notch 43 concentrates stress at the edge. FIG. 5 shows a tear erupting at a stress line 44 along the thinned wall section in the manner of a flap valve, thereby allowing an inflation gas 45 to escape. The tearing open of notch 43 actively vents the bladder chamber to keep pressures in the bolster below those where weld failures can occur and to improve energy absorption characteristics for decelerating an impacting passenger. The size of the resulting opening and the pressure at which tearing occurs can be controlled using a sloped thickness of the notch and the placement of initiator features aligned with the notch as described below.

Figure 6:
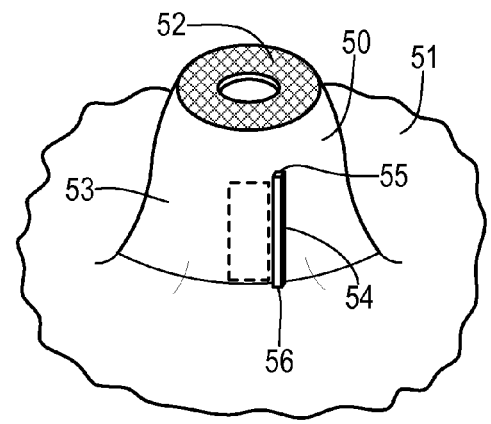
FIG. 6 is a perspective view of an attachment tower with another embodiment of an active vent including an initiator rib.

In one example, a molded feature such as an initiator rib is juxtaposed with the notch to concentrate stress along one longitudinal edge of the notch. The interplay of the reduced notch thickness and the increased thickness of the rib helps set a desired threshold pressure for tearing open the vent. As shown in FIG. 6, an attachment tower 50 projects from a bladder wall 51 to provide a welding surface 52 for attachment to the reaction wall. A notch 53 creates a thinned wall section in an interior surface of tower 50, and an initiator rib 54 is formed in the opposed, outer surface 55 of tower 50 so that rib 54 has one side substantially aligned with a longitudinal side of notch 53. Rib 54 is preferably integrally formed with both outer surface 55 and an upper surface 56 of bladder wall 51 so that during bladder inflation the expansion of wall 51 causes a stretching force along rib 54. For this reason, notch 53 and rib 54 are oriented on tower 50 such that their elongated sides extend in a substantially normal direction to the central region of bladder wall 51 (i.e., along the deployment direction). The resulting stress line where tearing is initiated receives a concentrated stress because of a stretching of rib 54 in the deployment direction.

Figure 7:
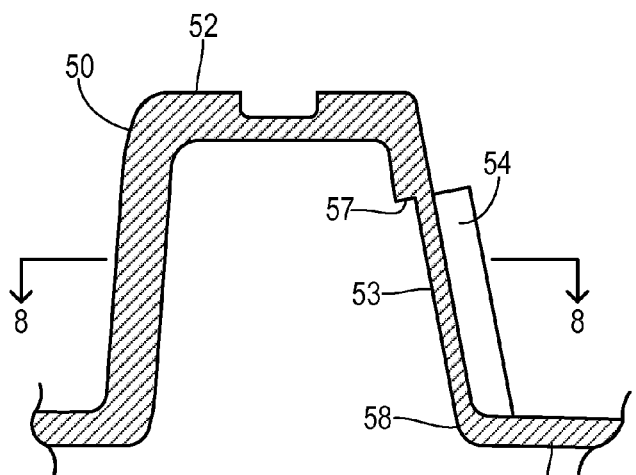
FIG. 7 is a cross-sectional view of the attachment tower of FIG. 6.

As shown in FIG. 7, notch 53 provides a reduced thickness of tower 50 such that an upper end 57 of notch 53 is closed and a lower end 58 is open. An open end allows convenient injection molding using a mold insert that can be easily withdrawn after molding is completed by providing an unobstructed path for removal.

Figure 8:
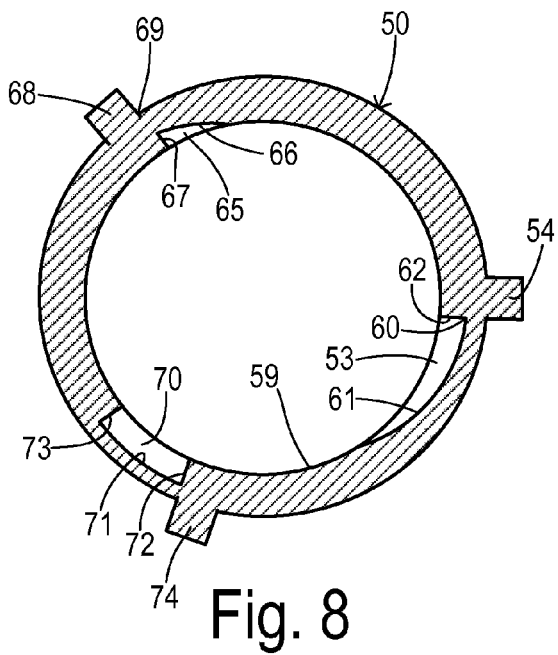
FIG. 8 is a cross section of the attachment tower of FIG. 6 taken along line 8-8 of FIG. 7.

FIG. 8 shows various configurations for elongated notches adapted to tear open at respective desired pressures and providing respective opening sizes with cross-sectional areas each adapted to vent at a respective rate. Notch 53 has a sloping thickness across notch 53 (i.e., from one longitudinal side to the other longitudinal side) which provides a least thickness (i.e., narrowest wall thickness) at longitudinal side 62. One side of rib 54 is substantially coplanar with side 62. The combination of a minimum notch thickness and the adjacency of rib 54 creates an especially strong stress line 60 with the desired venting characteristics.

The cross-sectional profile of notch 53 as seen in FIG. 8 comprises a sloped edge 61 extending from an interior surface 59 to radial, longitudinal edge 62. The length of sloped edge 61 (i.e., the distance over which extends circumferentially from radial edge 62) determines a flow cross section of the torn opening. To provide an example with a different opening pressure threshold and a different flow cross section, a notch 65 is shown having a sloped edge 66 and radial edge 67. An initiator rib 68 is aligned with edge 67. Edges 66 and 67 create a minimum wall thickness where they meet, resulting in a stress line 69. Sloped edge 66 extends over a much shorter distance than edge 61 of notch 53. Thus, when tower 50 tears along stress line 69, the resulting flap-valve opening is smaller and carries a lower flow volume than at notch 53. Moreover, the minimum thickness at stress line 69 is greater than the minimum thickness at stress line 60, which results in a higher threshold pressure being required for opening a tear at notch. In general, a longer, more shallow slope will create a wider tear and will vent more inflation gas, while a shorter and steeper slope will open less and will vent less inflation gas.

As shown by notch 70, a non-sloping cross-sectional profile can also be used. A three-sided channel is formed by edges 71, 72, and 73. An initiator rib 74 can be aligned with either longitudinal side of notch 70.

FIG. 9 shows a cross-sectional view of a mold insert 80 adapted to form four elongated notches in an injection molded attachment tower. Notches are formed on an interior surface of the tower, corresponding to sloped segments 81 and stepped segments 82. A dashed line 83 represents a surface of a mold cavity into which insert 80 is placed. Plastic material injected in the space between insert 80 and the mold ii) cavity forms the attachment tower.

FIG. 10 shows a mold insert 85 with protrusions 86 configured to create three-sided channels for the elongated notches. A mold cavity profile 87 includes slots 88 for forming corresponding initiator ribs on the outside surface of an attachment tower.

Since one longitudinal end of the notch is formed as an open end, mold inserts 80 and 85 may be formed as solid bodies which may be easily removed longitudinally from a molding machine in order to release the molded part. By using a slightly more complicated mold insert with moving parts (e.g., with a retractable rib for forming the notch), a notch can be formed with a closed as shown in FIG. 11. Thus, an attachment tower 90 extends from bladder wall 91 and includes a notch 92 formed in an interior surface between closed ends 93 and 94. An initiator rib 95 projects from the opposed, outer surface of tower 90 to be aligned with one longitudinal side of notch 92 as described above.

In designing an active bolster for use in a particular vehicle, target values for the threshold pressure at which venting occurs and the flow rate to be supported are specified according to the placement and expected impact loads for the vehicle. A plurality of notches would be distributed among one or more of the attachment towers to provide an aggregate flow cross section to obtain the needed flow rate. The notch slopes and thicknesses would be determined based on the pressure forces and the strength of the wall material.

What is claimed is:

1. An active bolster for mounting at an interior trim surface of a passenger compartment in an automotive vehicle, comprising:
a plastic-molded front wall for deploying in a deployment direction toward a passenger in the passenger compartment;
a plastic-molded back wall joined around a substantially sealed perimeter with the front wall to form an inflatable bladder, wherein the back wall includes at least one substantially circumferential pleated baffle and a plurality of attachment towers projecting from a central region disposed within the baffle to join with a reaction surface; and
an inflator for coupling an inflation gas into the inflatable bladder in response to a crash event of the vehicle;
wherein at least one of the attachment towers includes an elongated notch sunk partially into a surface of the at least one of the attachment towers to provide a thinned wall section configured to tear open at a predetermined pressure during inflation.

2. The active bolster of claim 1 wherein the at least one of the attachment towers further includes an initiator rib projecting from an opposed surface of the at least one of the attachment towers aligned with a longitudinal side of the notch, thereby creating a stress line where tearing is initiated.

3. The active bolster of claim 2 wherein the elongated notch and the initiator rib each extends along the deployment direction.

4. The active bolster of claim 1 wherein the notch has a sloping thickness across the notch to provide a least thickness along one longitudinal side, thereby creating a stress line where tearing is initiated.

5. The active bolster of claim 1 wherein the notch is formed in an interior surface of the at least one of the attachment towers, wherein the notch has a cross-sectional profile with a sloped edge and a radial edge, wherein the sloped edge has a substantially constant slope from the interior surface of the at least one of the attachment towers to meet the radial edge.

6. The active bolster of claim 1 wherein the notch is formed in an interior surface of the at least one of the attachment towers, wherein the notch has a cross-sectional profile comprising a three-sided channel.

7. The active bolster of claim 1 wherein the notch has a sloping thickness across the notch to provide a least thickness along one longitudinal side, and wherein the at least one of the attachment towers further includes an initiator rib projecting from an opposed surface of the at least one of the attachment towers aligned with the one longitudinal side of the notch, thereby creating a stress line where tearing is initiated.

8. The active bolster of claim 7 wherein the elongated notch and the initiator rib each extends substantially along the deployment direction.

9. The active bolster of claim 1 wherein the at least one of the attachment towers includes a plurality of elongated notches, each notch sunk partially into a surface of the at least one of the attachment towers to provide a thinned wall section configured to tear open at a predetermined pressure during inflation.

10. The active bolster of claim 1 wherein the attachment towers are each generally cylindrically shaped.

11. The active bolster of claim 1 wherein the attachment towers are each welded to the reaction surface.

12. A bladder for an active bolster comprising:
a trim wall;
a bladder wall sealed to the trim wall, having central bosses for attachment to a reaction surface; and
an inflator supplying inflation gas between the walls to inflate the bolster;
wherein at least one of the central bosses includes an elongated notch sunk partially into a boss surface to provide a thinned wall section configured to tear open at a predetermined pressure during inflation.

13. An active glove box door for a vehicle comprising:
an inner door panel configured to span a glove box frame to provide a reaction surface;
a trim wall;
a bladder wall sealed to the trim wall, having central attachment bosses welded to the reaction surface; and
an inflator supplying inflation gas between the walls to inflate the door;
wherein at least one of the central attachment bosses includes an elongated notch sunk partially into a boss surface to provide a thinned wall section configured to tear open at a predetermined pressure during inflation.

* * * * *